United States Patent [19]

Wills

[11] 4,425,539
[45] Jan. 10, 1984

[54] CONTROL SYSTEM FOR AC INDUCTION MOTOR

[75] Inventor: Frank E. Wills, York, Pa.

[73] Assignee: Borg-Warner Corporation, Chicago, Ill.

[21] Appl. No.: 373,554

[22] Filed: Apr. 30, 1982

Related U.S. Application Data

[63] Continuation-in-part of Ser. No. 129,958, Mar. 13, 1980, abandoned.

[51] Int. Cl.³ .......................... H02P 1/32; H02P 5/28
[52] U.S. Cl. .................................................. 318/771
[58] Field of Search .............. 318/771, 729, 455, 499, 318/495, 332; 361/30

[56] References Cited

U.S. PATENT DOCUMENTS

| | | | |
|---|---|---|---|
| 1,902,444 | 3/1933 | Hobart et al. ...................... | 318/771 |
| 2,106,833 | 2/1938 | Eames . | |
| 2,709,775 | 5/1955 | Delcarlo ............................ | 318/771 |
| 3,509,824 | 5/1970 | Schmidly, Jr. ..................... | 417/12 |
| 3,764,872 | 10/1973 | Boice . | |
| 3,863,741 | 2/1975 | Mhsuishi . | |
| 3,931,559 | 1/1976 | McKee ............................... | 318/455 |
| 4,084,406 | 4/1978 | Brenneman . | |
| 4,220,440 | 9/1980 | Taylor et al. ...................... | 417/12 |

*Primary Examiner*—David Smith, Jr.
*Attorney, Agent, or Firm*—James E. Tracy

[57] ABSTRACT

A control system is disclosed for connecting the primary windings of a three-phase AC inducton motor in a delta-connection at heavy loads and for automatically reconnecting the windings in a wye-connection at light loads to effect energy savings. Power sensing means produces a control signal which is directly proportional to the power applied to the induction motor. Differential comparator means respond to the control signal and to an adjustable reference signal, representing a preselected power input level, for generating an actuating signal for switching a wye-delta starter between two conditions, one of which effects the wye connection and the other the delta connection. When the power input is below the preselected level the wye-connection is established, whereas the delta-connection is made when the power input is above the preselected level.

2 Claims, 2 Drawing Figures

CONTROL SYSTEM FOR AC INDUCTION MOTOR

CROSS-REFERENCE TO RELATED APPLICATION

This is a continuation-in-part application of application Ser. No. 129,958, filed Mar. 13, 1980 now abandoned.

BACKGROUND OF THE INVENTION

1. Field of the Invention:

This invention relates generally to a control system for an AC induction motor and, more particularly, it relates to a control system for connecting the primary windings of an AC induction motor in a delta-connection at heavy loads and for automatically reconnecting the windings in a wye-connection at light loads to effect energy savings.

2. Description of the Prior Art:

U.S. Pat. No. 1,902,444 issued to Hobart et al on Mar. 21, 1933 discloses an AC motor having stator windings that are connected in either mesh (delta) or star (wye), depending on the magnitude of the load current. By sensing the load current and controlling the winding connections in response to that sensed current, the stator windings may be connected in star or wye for low load current and in mesh or delta for high load current.

In U.S. Pat. No. 2,106,833 issued to W. F. Eames on Feb. 1, 1938, there is disclosed a motor and control system for operating a moving stairway by connecting the primary windings of the motor in a star or wye connection for low speed and changing the windings from the star connection to a delta connection for high speed when needed for carrying passengers. A light-sensitive device is utilized to detect the presence of persons for controlling the stairway to operate at the low and high speeds.

U.S. Pat. No. 2,709,775 issued to A. Del Carlo on May 31, 1955, discloses an automatic regulation system for a motor in which the motor windings are switched from delta to star connection only for such load variations which are maintained for a certain length of time. The switching operation is in response to the amount of current supplied to the motor which corresponds to a predetermined load condition.

In U.S. Pat. No. 3,863,741 issued to Y. Mitsuishi on Feb. 4, 1975, there is shown a control system for reel assembly winding and unwinding a power supply cable of an electrically powered earth-moving machine which includes a three-phase induction torque motor mechanically driving the reel assembly. The torque motor is selectively connected to an electric source by a wye-connection when the machine moves forward and by a delta-connection when the machine moves backward. A shift lever is utilized for changing the moving direction of the machine which is connected to the gear box.

U.S. Pat. No. 4,084,406 issued to D. A. Brenneman on Apr. 18, 1978, shows a solid state starter for a chiller compressor motor which includes a motor current sensing circuit which controllably switches a bank of silicon-controlled rectifiers to conduct current to the motor for starting and running.

In various applications of machines, such as centrifugal turbocompressors, driven by AC induction motors, the operation of the motors is subjected to a wide range of load conditions. It is known that such motors can be constructed to operate with high efficiency and power factor values during full load conditions, but when the motors are operated at reduced or light load conditions the efficiency and power factor are substantially decreased thus causing a waste of energy. For optimum operation during normal or full load conditions, the motor windings are usually connected in delta. In accordance with the present invention, it has been found that significant improvements in efficiency and power factor can be achieved by reconnecting the primary windings of such AC motors in a wye-connection, for coupling to the electric source, in response to the power delivered to the motor load dropping below a preselected level.

SUMMARY OF THE INVENTION

Accordingly, it is a general object of the present invention to provide a new and improved control system for connecting the primary windings of an electric motor in a delta-connection at heavy loads and for automatically reconnecting the windings in a wye-connection at light loads to effect energy savings.

It is another object of the present invention to provide a novel control system for reconnecting the primary windings of an AC induction motor in a wye-connection for coupling to a source of three-phase power, in response to the power delivered to the motor load dropping below a preselected level.

It is another object of the present invention to provide a unique control system, for connecting the primary windings of an AC induction motor, which includes a differential comparator circuit for generating an actuating signal to operate a switching device so as to establish alternately and selectively a wye-connection and a delta-connection between the electric motor and a three-phase electric source.

It is still another object of the present invention to provide a unique control system having a wye-delta starter for connecting the primary windings of an AC induction motor in wye and delta configurations, the starter being controlled in response to sensed power input. A feature of the invention resides in utilizing a conventional wye-delta starter, which is usually already present in a power coupling system to an AC motor in order to control the winding connections so that the windings are automatically connected in wye at start-up to reduce the inrush current, the starter then normally reconnecting the motor windings in delta after a timed delay.

It is still another object of the present invention to provide a novel control system which includes a switching device, a power transducer, and a differential comparator circuit all operatively connected so as to connect the primary windings of an electric motor in a delta-connection when the power input is above a preselected level and to connect the windings in a wye-connection when the power delivered to the motor load, from a three-phase power source, drops below the preselected level.

It is yet still another object of the present invention to provide a control system which is relatively simple in construction and easy to manufacture.

In accordance with these aims and objectives, there is provided in accordance with the instant invention a control system for coupling the primary windings of an AC induction motor to a source of three-phase electric power. The system comprises a wye-delta starter for coupling the primary windings to the power source in order to apply power to the induction motor and which, in response to starting, connects the primary windings into a wye-connection to limit the inrush current normally occurring at start-up. Power sensing means are provided for generating a control signal which is directly proportional to the power applied to the induction motor. Differential comparator means respond to the control signal and to an adjustable reference signal, representing a preselected power input level, for generating an actuating signal for switching the wye-delta starter between a first condition, wherein the primary windings are connected in a wye-connection, and a second condition wherein the primary windings are connected in a delta-connection. The first condition (which effects a wye-connection) is established, to improve the power factor and to effect energy savings, during light loads when the power applied to the induction motor is below the preselected power input level, whereas the second condition (providing a delta connection) is established during heavier loads when the power applied to the motor is above the preselected power input level.

Hence, during full load conditions the windings will be connected in the delta configuration. If the mechanical load driven by the motor drops, the horsepower output and the power input will likewise drop. If the load decreases to the extent that the power input reduces to the preselected level, the motor windings will automatically be reconnected to the wye configuration.

DESCRIPTION OF THE DRAWING

These and other objects and advantages of the present invention will become more fully apparent from the detailed description when read in conjunction with the accompanying drawing in which.

DESCRIPTION OF THE PREFERRED EMBODIMENT

Figure 1:
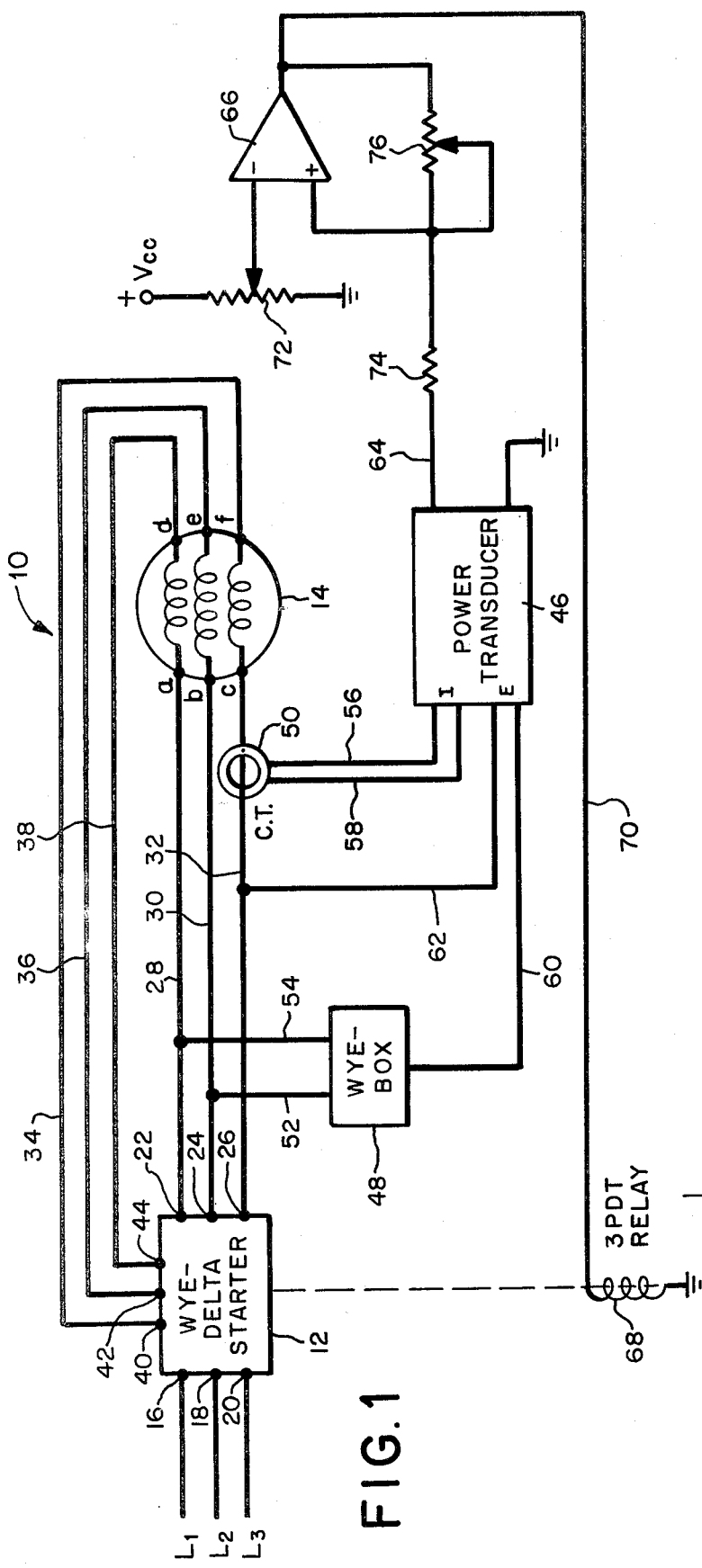
FIG. 1 schematically illustrates a control system, constructed in accordance with the present invention, for coupling the primary windings of an AC induction motor to a source of three-phase electric power.

Referring now with particularity to the drawing, there is shown a schematic block diagram of a control system 10 constructed in accordance with the principles of the instant invention. The control system includes a switching device 12, in the form of a conventional wye-delta starter, connected between a three-phase AC electric power source and a load circuit consisting of a three-phase AC induction motor 14. The power source is connectable to input terminals 16, 18 and 20 of wye-delta starter 12 via the polyphase input lines L1, L2 and L3. The output terminals 22, 24 and 26 of the wye-delta starter are joined to the respective polyphase lines 28, 30 and 32. The terminals 14a, 14b and 14c are each tied to one end of the three respective primary windings of the motor 14 and also to the respective polyphase lines 28, 30 and 32. Conductors 34, 36 and 38 are connected between the respective output terminals 40, 42 and 44 of the starter 12 and the respective terminals 14d, 14e and 14f of the motor 14. Terminals 14d, 14e and 14f are also joined to the other ends of the three primary windings of the motor 14.

It is to be noted that a salient feature of the invention resides in utilizing existing equipment to achieve reconnection of the three primary windings of the AC motor 14 into a wye-connection at reduced load to effect energy savings. To explain, it is common practice to employ a wye-delta starter (like starter 12) with a three-phase induction motor, particularly when the motor drives a compressor, in order to initially energize the motor with its windings connected in wye, thereby reducing the inrush current normally occurring at start-up. After a timed delay interval, the starter usually reconnects the primary windings in delta. Current drawn from the three-phase power source by a wye-connected motor is substantially less than that drawn by the same motor with the windings connected in delta. Hence, the starting current will only be a fraction of that otherwise drawn without the wye-delta starter. As will be appreciated, the instant invention employs the already-present wye-delta starter to control the primary winding connections as a function of load conditions, as reflected by the power input to the motor, the windings being connected in wye for light loads and in delta for heavier loads.

The control system, illustrated in FIG. 1, comprises power sensing means which includes a power or watt transducer 46, a wye-box 48, and a current transformer 50. For sensing the voltage from phase to neutral applied to the motor 14, wye-box 48 is used to provide a pseudo-neutral point by having its input via lines 52 and 54 connected to the polyphase lines 30 and 28, respectively. For measuring the current drawn by motor 14, current transformer 50 is disposed around the polyphase line 32. The power transducer 46 has its current input terminals connected to the current transformer 50 via conductors 56 and 58. The voltage input terminals of power transducer 46 are connected to the output of wye-box 48 via line 60 and to polyphase line 32 via conductor 62. A control signal is generated at the output of the power transducer 46, and on the conductor 64, which is directly proportional to the power applied to induction motor 14.

The differential comparator circuit, with adjustable hysteresis, consists of an operational amplifier 66 and a three-pole double-throw relay 68 which is connected to the output of the amplifier 66 via line 70. This is commonly known as a Schmitt trigger circuit. The operational amplifier 66 has its inverting input connected to a positive dc voltage source Vcc via a potentiometer 72 so as to provide an adjustable threshold or reference signal. The non-inverting input of the amplifier 66 is coupled through a fixed resistor 74 and line 64 to the output of the power transducer 46. The non-inverting input is regeneratively coupled, via a potentiometer 76, to the output of operational amplifier 66. The relay 68 is provided with three normally opened contacts (not shown) which are connected operatively in a conventional manner for operating the wye-delta starter 12.

The watt or power transducer 46 is preferably of the type manufactured and sold by Ohio Semitronics, Inc. under their designation Model Number PC5-36D. The wye-box 48 is formed by interconnecting appropriate resistance values with the voltage terminals of transducer 46 so as to produce a wye network with a pseudo-neutral point. As mentioned, the wye-delta starter 12 can be of any conventional commercially available type, the specific current rating on the controller contacts being selected to be of suitable value for the desired motor load.

Assume that during start-up motor 14 is required to drive a normal full mechanical load. Starter 12 will function in conventional manner at that time and will initially effect a wye winding connection to limit the inrush current to the motor, the starter after a timed delay interval reconnecting the primary windings in delta. Assume now that following the start-up period the mechanical load reduces and motor 14 operates under light load conditions, the motor thereby providing a much lower horsepower output. The three-phase electric power applied to the polyphase lines L1, L2 and L3 therefore decreases to a level which causes starter 12 to switch the winding connections to the wye configuration. To explain, the control voltage on line 64, which voltage is directly proportional to the power input to the motor, will now be below the adjustable reference signal (which represents a preselected power input level) applied to the inverting input of operational amplifier 66. Typically, this threshold level is set to a preselected value equal to approximately 30% of the normal full load conditons. Under these conditions the output voltage of amplifier 66 on line 70 will be substantially zero and relay 68 will be deenergized, causing starter 12 to be in its condition wherein the primary windings are wye-connected. As will become apparent, the reference signal applied to amplifier 66 from potentiometer 72 also effectively represents the switchover threshold at which the winding connections are switched between wye and delta connections.

It will now be assumed that the mechanical load on the motor (and consequently the horsepower output from the motor) increases to the extent that the switchover threshold is exceeded. Under these heavy or full load conditions, the control signal on line 64 increases due to the increased power applied to the motor and the output of amplifier 66 switches to a relatively high voltage since the preselected power input level, represented by the reference signal applied to the amplifier, will be exceeded. The relatively high voltage on line 70 energizes relay 68 which in turn switches the wye-delta starter 12 to its condition wherein the primary windings are connected in delta. Thereafter, if the motor load drops below the switchover level, causing the power input to the motor to drop below the preselected level, relay 68 will become deenergized again and starter 12 will automatically be switched back to its condition which connects the primary windings into a wye-connection.

The potentiometer 76, provided in the feedback circuit of amplifier 66, provides a hysteresis adjustment for adjusting the switchover hysteresis. As is well known, hysteresis is a form of non-linearity or backlash in which the response of a circuit to a particular input condition depends, not only on that input condition, but also on the immediate past (recent history) of the input and output signals. Hysteretical behavior is characterized by inability to "retrace" exactly on the reverse swing a particular locus of input/output conditions, thus preventing rapid cycling between wye and delta connections when close to the threshold.

Figure 2:
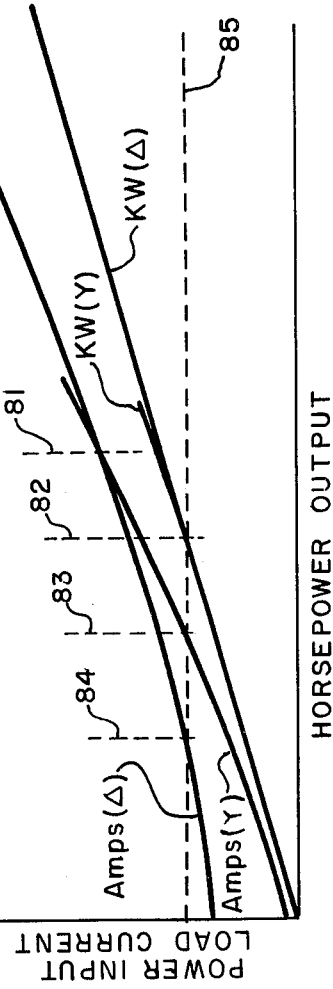
FIG. 2 is a graphical illustration of the performance of the motor under different horsepower output, or mechanical load, conditions for both the wye (Y) and delta (Δ) winding connections, two of the curves in FIG. 2 plotting (on the ordinate) the load currents (amps) for the wye and delta connections as functions of the horsepower output (on the abscissa), while the other two curves plot (also on the ordinate) the power input (KW) to the motor for the two winding connections versus the horsepower output. The performance curves of FIG. 2 will be helpful in understanding the significant improvement made by the present invention over the prior wye-delta switching systems.

The improvement made by the present invention over prior wye-delta switching systems, which respond to sensed current rather than to sensed power, is clearly evident by the four curves of FIG. 2. These curves show load current (amps) and power input (KW), for wye (Y) and delta (Δ) connections, versus horsepower output, namely the mechanical load driven by the motor. The curves describe the difference in performance that would occur if current, rather than power input, were used to sense horsepower output.

Inspection of these curves will show that wye and delta amps intersect at approximately the horsepower indicated by dashed construction line 81 and diverge rapidly as zero horsepower is approached, reaching a difference of about 70% at that point. Observe, however, that wye and delta KW (power input) converge at approximately the horsepower indicated by dashed construction line 82 and remain so all the way down to zero horsepower.

If a horizontal line (like dashed construction line 85), representing a switchover threshold, is drawn through the current curves at any point below the horsepower indicated by line 81, the horizontal line will intersect both the wye and delta current at ever increasing divergent points representing horsepower (see the points indicated by dashed construction lines 83 and 84). If, however, a horizontal line, representing a switchover threshold, is drawn through the KW curves at any point below the horsepower indicated by line 82, there is only one point of intersection because of the converged delta and wye curves. What this means is that switchover hysteresis, which is used to prevent hunting, cannot adequately be controlled if current, rather than kilowatts (KW), is used to sense horsepower output. By using KW, hysteresis may be determined and adjusted by the differential comparator.

To explain further, the previously developed wye-delta switching systems which respond to sensed current have a stability problem. When the switching between wye and delta connections is made in response to current, rather than to power, the switching threshold cannot be accurately controlled. When the sensed load current indicates a light load and the motor windings are switched to a wye-connection, the load current will take a dramatic drop. This is clearly evident in FIG. 2. The output of the current sensing device therefore drops to the same extent. If the mechanical load driven by the motor then increases and the system is switched to its delta operating mode, the sensed load current suddenly increases drastically. By controlling the switchover in response to load current, excessive hysteresis will occur around the switching level.

In sharp contrast, by controlling the switchover between wye and delta in response to the power supplied to the motor, as in the present invention, there is no significant change in the output of the sensing apparatus when a switchover is made from wye to delta or viceversa. This obtains because it is the power supped to the motor which is being measured or sensed and this power input is determined by the mechanical load driven by the motor and will be substantially the same whether the motor windings are connected in wye or in delta. The power factor will vary when switching between the two modes (the power factor improves or increases when the windings are wye-connected) but the power input will remain nearly constant. Thus, by sensing power and controlling the switchover between wye and delta in response to the sensed power level, mode switching is accomplished with considerably greater precision and there is no excessive hysteresis around the power level at which switching is made.

While there has been illustrated and described what is at present to be a preferred embodiment of the present invention, it will be understood by those skilled in the art that various changes and modifications may be made and equivalence may be substituted for elements thereof without departing from the true scope of the invention. In addition, many modifications may be made to adapt a particular situation or material to the teachings of the invention without departing from the central scope thereof. Therefore, it is intended that this invention not be limited to the particular emodiment disclosed as the best mode contemplated for carrying out this invention but that the invention will include all embodiments falling within the scope of the appended claims.

I claim:

1. A control system for coupling the primary windings of an AC induction motor to a source of three-phase electric power, comprising;

a wye-delta starter for coupling the primary windings to the power source in order to apply power to the induction motor and which, in response to starting, connects the primary windings into a wye-connection to limit the inrush current normally occurring at start-up;

power sensing means for generating a control signal which is directly proportional to the power applied to the induction motor;

and differential comparator means responsive to said control signal and to an adjustable reference signal, representing a preselected power input level, for generating an actuating signal for switching the wye-delta starter between a first condition, wherein the primary windings are connected in a wye-connection, and a second condition wherein the primary windings are connected in a delta-connection, the first condition being established, to effect energy savings, during light loads when the power applied to the induction motor is below the preselected power input level, whereas the second condition is established during heavier loads when the power applied to the motor is above the preselected power input level.

2. A control system as claimed in claim 1, wherein said power sensing means comprises a power transducer having its inputs coupled to the output of a wye-box for sensing voltage and to the output of a current transformer for detecting current, said power transducer having an output on which the control signal is generated; wherein said differential comparator means comprises an operational amplifier, to the inverting input of which is applied the adjustable reference signal and to the non-inverting input of which amplifier is appled the control signal, the actuating signal being produced at the output of the operational amplifier; and wherein said operational amplifier includes a feedback potentiometer interconnected between its output and its non-inverting input for providing a hysteresis adjustment.

* * * * *